W. ROKOSZ.
RESILIENT WHEEL.
APPLICATION FILED APR. 15, 1919.
1,311,999.
Patented Aug. 5, 1919.
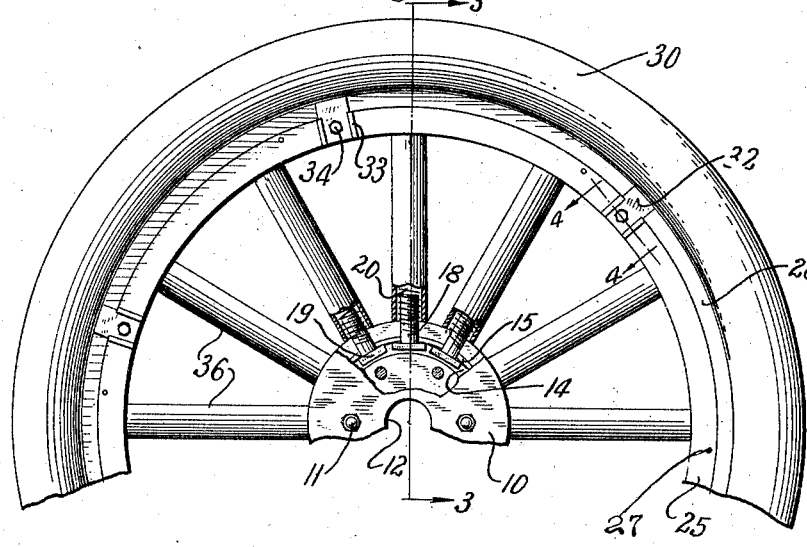
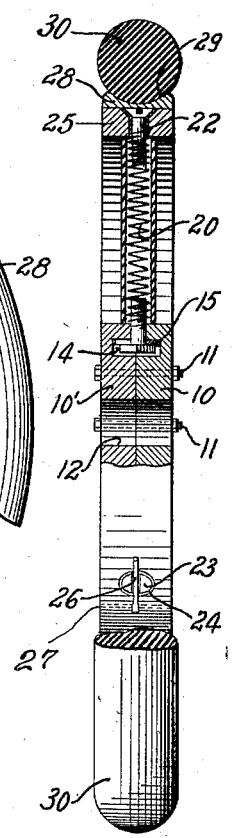
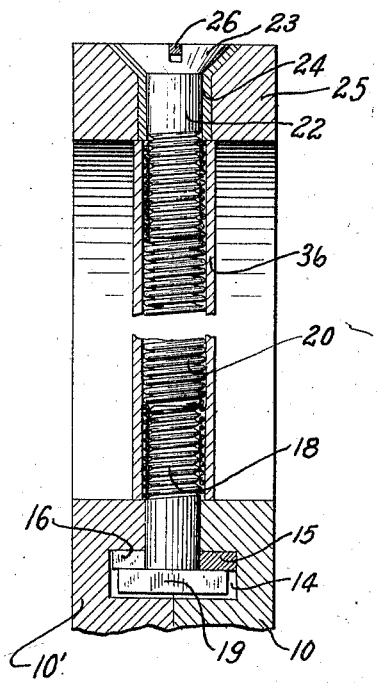
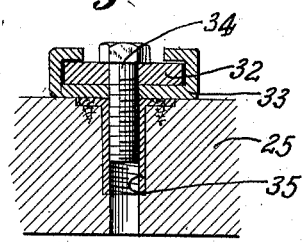
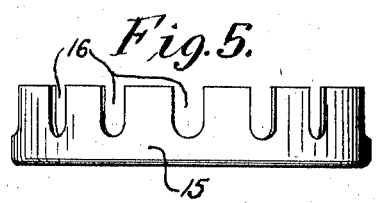
INVENTOR
Walter Rokosz.
BY Frederick Myers
ATTORNEY

UNITED STATES PATENT OFFICE.

WALTER ROKOSZ, OF CALUMET, MICHIGAN.

RESILIENT WHEEL.

1,311,999.  Specification of Letters Patent.  Patented Aug. 5, 1919.

Application filed April 15, 1919. Serial No. 290,254.

*To all whom it may concern:*

Be it known that I, WALTER ROKOSZ, a citizen of Austria, residing at Calumet, Michigan, have invented new and useful Improvements in Resilient Wheels, of which the following is a specification.

This invention relates to improvements in vehicle wheels and particularly to those of a high grade type, as used upon the better class of vehicles.

The principal object of the invention is to provide a wheel in which the spokes, or communicating elements between the hub and the rim, are of a resilient nature, so that the wheel is of flexible nature, additionally to its cushion tire.

A further object is to provide a resilient wheel, similar in appearance to those of common construction, and presenting no objectional features.

These and other like objects, which will become more fully apparent as the description progresses, are attained by the novel construction and combination of parts hereinafter described and shown in the accompanying drawings, forming a material part of this disclosure, and in which—

Figure 1 is a partial side elevational view showing a wheel made in accordance with the invention, parts being broken away disclosing its construction.

Fig. 2 is a partial front and partial sectional view taken substantially through the center of the wheel.

Fig. 3 is an enlarged fragmentary sectional view showing the arrangement of spokes and their connection with the wheel, the section being taken on line 3—3 of Fig. 1.

Fig. 4 is a fragmentary sectional view taken on line 4—4 of Fig. 1, and

Fig. 5 is a side elevation view showing a detail of construction.

Referring to the drawings, a rigid hub comprised of two symmetrical halves 10 and 10′, held by clamp bolts 11, is provided with the usual central opening 12 for the reception of the axle, the hub being substantially a disk, and containing between its inner adjacent sides, annular recesses 14, extending equally into both sections and in these recesses is a ring 15 having a number of slots 16 extending in from one of its edges, receptive of the stems of screws 18 having thin flat square heads 19 disposed in the inner portion of the recess 14, the screw stems extending out through radial openings formed in the hub elements 10 and 10′, the threaded ends of the screws being engaged with ends of coiled compression springs 20 while the outer ends of the springs are engaged by screws 22 extending in through the wheel rim 25.

The heads 23 of the screws 22 are beveled and received within metal bushings 24 set rigidly in the rim 25, and in order to prevent these heads from turning after they have been adjusted, a latch bar 26 is fixed in the rim and adapted to enter the slots in the screw heads, maintaining them from rotating.

Fixed upon the wheel rim 25 is an annular band 28, having a concave circumferential recess 29 engageable with the solid rubber cushion tread 30, which is of the usual circular cross section. The band 28 is held in position on opposite sides of the wheel rim 25 by a plurality of clips 32, held in slides 33 attached to the rim by bolts 34, so as to secure the tread in firm relation with the wheel, the bolts being held in sockets 35 set rigidly in the rim structure.

Surrounding the springs 20 are flexible casings or tubes 36 the same extending from the hub to the inner diameter of the rim, screening the springs from observation, and at the same time preventing dust and dirt from entering.

In operation, it will be understood that the strength of the springs 20 is sufficient not only to carry the weight transmitted from the hub, but also to cause the tread 30 to rotate uniformly with the hub; but if in passing obstructions, rough places and the like, the resiliency of the cushion tire 30 should fail to respond, obviously the springs 20 give slightly, so as to permit a limited relative movement of the hub and tread, an action necessary in obtaining the best results of the vehicle.

Having thus described my invention, what I claim as new, and desire to secure by Letters Patent, is—

In a flexible wheel, the combination with a rigid hub formed in sections, a rim circumjacent thereto, and a tire disposed around said rim, of an annular recess formed in said hub, a ring set therein, bushings fixed in said rim, screws rotatable in said bushings, other screws in said hub extending through said ring, helically wound compression springs engaged by said screws, means for securing the heads of said screws when adjusted, and flexible coverings encircling said springs so as to form a complete closure.

In testimony whereof, I have signed my name to this specification in the presence of two subscribing witnesses, this 15th day of February 1919.

WALTER ROKOSZ.

Witnesses:
JOHN W. TOBOLA.
IGNACY KLUNOWSKI.

Copies of this patent may be obtained for five cents each, by addressing the "Commissioner of Patents, Washington, D. C."